United States Patent

[11] 3,580,525

[72] Inventor Horst Dopner
Bensberg-Frankenforst, Germany
[21] Appl. No. 777,803
[22] Filed Nov. 21, 1968
[45] Patented May 25, 1971
[73] Assignee Telefunken, Patentverwertungsgesellschaft m.b.H., Ulm Donau, Germany
[32] Priority Nov. 21, 1967
[33] Germany
[31] P 15 49 107.3

[54] ARRANGEMENT MAINTAINING CONSTANT TAPE TENSION IN MAGNETIC TAPE RECORDERS
10 Claims, 2 Drawing Figs.

[52] U.S. Cl. .......... 242/189, 242/75
[51] Int. Cl. .......... B65h 59/38, G03b 1/04, G11b 15/32
[50] Field of Search .......... 242/75, 75.5, 187, 189

[56] References Cited
UNITED STATES PATENTS
1,654,800 1/1928 Garbutt .......... 242/189
1,944,039 1/1934 Sweet .......... 242/189
2,911,162 11/1959 Kyle, Jr. .......... 242/189

*Primary Examiner*—Leonard D. Christian
*Attorney*—Spencer and Kaye

ABSTRACT: Arrangement for maintaining constant the tension of the tape on the reels of a magnetic tape recorder during its normal forward and rewind operations. Feeler means is disposed in the path of the tape near the takeup reel. Such feeler means is arranged to respond to the tension in the tape to control the brake associated with the takeup spindle. Means are provided for automatically reversing, during rewind operation, the effect which the feeler means has on such brake during normal forward operation and thereby providing a control of the tension in the tape for both normal forward and rewind operations.

Inventor:
Horst Döpner
By: Spencer & Kaye
Attorneys

Inventor:
Horst Döpner
By: Spencer & Kaye
Attorneys

ARRANGEMENT MAINTAINING CONSTANT TAPE TENSION IN MAGNETIC TAPE RECORDERS

BACKGROUND OF THE INVENTION

The present invention relates to an arrangement for maintaining constant the tape tension in a magnetic tape recorder.

It is customary in magnetic tape recorders to brake the spindle being pulled in order to produce the required tension. When braking with a constant moment, however, the tension in the tape changes by an amount which is a function of the diameter of the wound tape. In order to counteract this, one known technique is to vary the braking moment with the diameter of the tape on the spindle so that the tension in the tape remains approximately constant over the entire length of the tape.

Often feelers are provided for this purpose ahead of the spindles in the path of the tape, with the feeler associated with the spindle being pulled controlling the braking moment of the brake acting thereon in dependence on its movement which is determined by the tension in the tape. Since the tape tension at the pulled spindle increases with constant braking moment and decreasing diameter of the wound tape, the associated feeler must act in such a manner that the braking moment decreases with decreasing diameter of the wound tape, i.e. the brake is lifted as the diameter of the wound tape at the pulled spindle decreases.

When fast speeds are employed for forward and reverse operation, this type of control operates satisfactorily. During normal forward speeds, (i.e., during "record" or "playback"), however, the tape conveying mechanism provided between the supply and takeup spindles also exerts an influence on the tape. At the supply spindle, which is pulled by the drive capstan, the tape tension is maintained constant by the feeler-controlled brake. The takeup spindle, however, is also driven in order to produce the required tape tension for winding up the tape. If this drive has a constant moment, the tape tension increases with increasing diameter of the wound tape, i.e. the drive moment must be reduced correspondingly by braking if the the tape tension is to remain constant at the takeup spindle. Since the brake at the takeup spindle, which is controlled by a feeler associated therewith, is constructed to function during fast rewinding—this spindle then becoming the pulled one—the feeler is moved in such a manner, during normal forward speed, that the brake is lifted or disengaged more and more in response to the tape tension. Such tape tension increases as the diameter of the wound tape increases, and, therefore, there is nothing to counteract this increase in the tape tension.

With such an arrangement, therefore, it is not possible to control the tape tension at the takeup spindle during normal forward speeds. In practice the feeler at the takeup spindle is usually even blocked in order to prevent the forming of a loop at the beginning of the operation.

Due to the lack of tape tension regulation at the takeup spindle, wide variations in the diameter of the wound tape can not be handled effectively. Since, moreover, the tape tension is not the same before and behind the guide spindle, a certain amount of tape slippage at the guide spindle must be expected.

The use of such mechanical tape tension regulators has been restricted, therefore, to home tape recorders. This is due to such tape tension regulators being simple in construction, hence, relatively inexpensive, and also due to the fact that in home tape recorders variations in the diameter of the wound tape remain within a ratio of approximately 1:3 and, therefore, a slight amount of slippage at the drive capstan is permissible.

In high quality tape recorders, used for example in broadcasting studios, which must operate in a fault free manner even with wide variations in the diameter of the wound tape and in which the slippage of the tape at the drive capstan must be as little as possible, more elaborately constructed, hence, expensive, electrical or electronic tape tension regulators are employed.

SUMMARY OF THE INVENTION

It is an object of the present invention to provide an improved mechanical tape tension regulator which meets the requirements of high quality tape recorders and which thus makes possible the production of even high quality tape recorders at reduced cost and without any loss in their quality.

The present invention is based on a device for tape recorder which can maintain constant the tension of the tape thereon by providing feelers disposed in the path of the tape and near the spindles. Such feelers control the brakes associated with the spindles in dependence on their movement determined by the tape tension.

According to the present invention, means are provided for automatically reversing the effect which the feelers have with respect to the brake associated with the takeup spindle, during normal forward operation (i.e. "record" or "playback"), while rewinding.

Preferably, a double-armed lever is provided which is caused to pivot around its axis by means of an associated feeler and which is engaged by the brake eccentrically connected with respect to its pivoting axis. A linking member provided between feeler and brake is so adjustable that depending on the type of operation desired, the feeler acts on one arm of the lever during normal forward operation and on the other arm of the lever during rewinding.

The approach taught by the present invention provides a relatively simple means for controlling the tape tension even on the takeup spindle side of the tape recorder during normal forward operation and, as tests have shown, changes in the diameter of the wound tape up to a ratio of 1:10 can be effectively handled. Only a very slight, but constant, difference in tape tension in front of and behind the drive capstan is experienced. This permits the pressure roller which presses the tape against the guide spindle to have a low pressure and ensures that the amount of slippage experienced between the beginning and the end of the tape is kept to a minimum.

DESCRIPTION OF THE PREFERRED EMBODIMENTS

Figure 1:
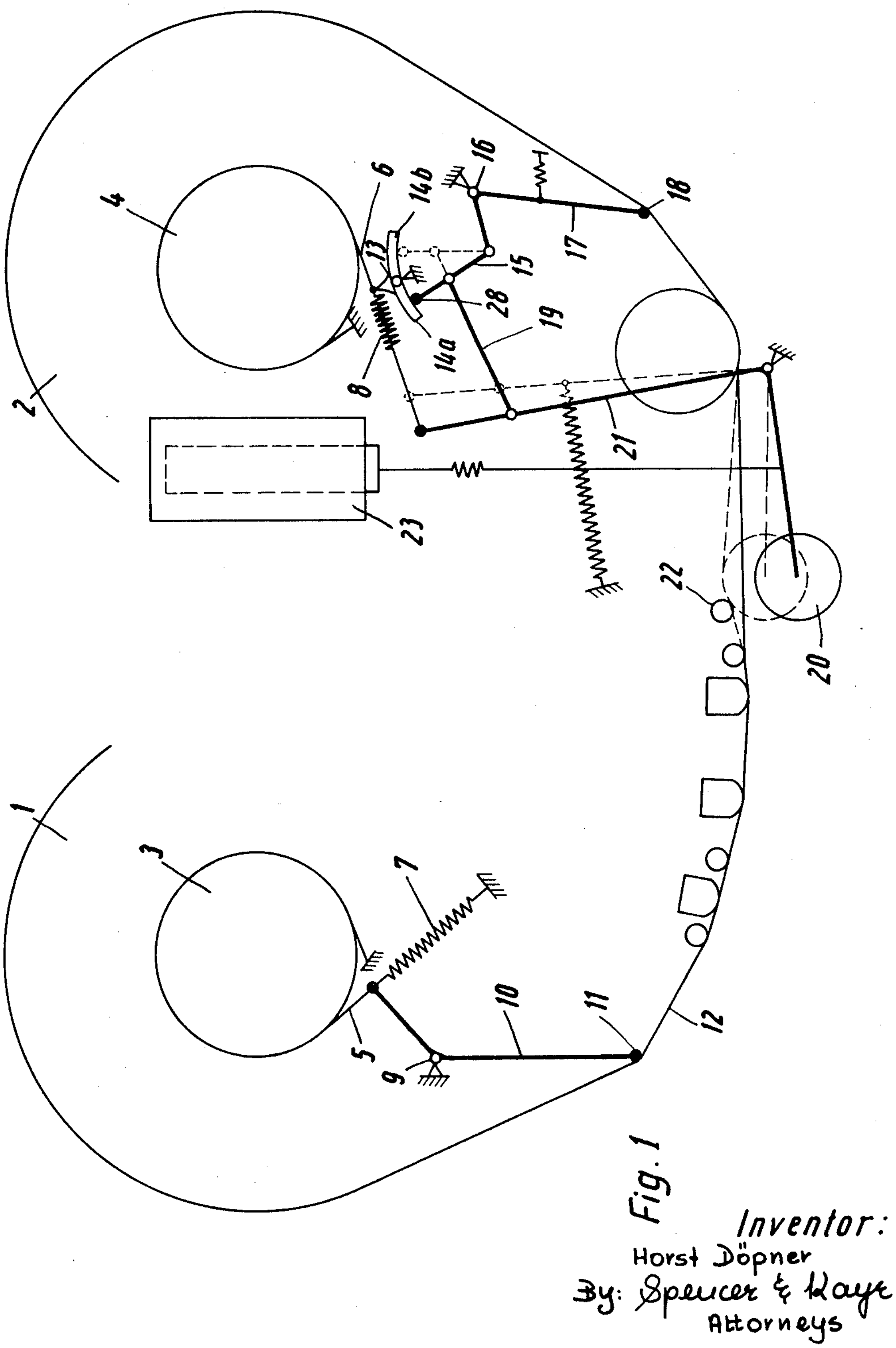
FIG. 1 is a schematic view of the path which the tape travels in a tape recorder provided with a tape tension regulating arrangement in accordance with the present invention.

In FIG. 1 the two reels for the magnetic tape are marked 1 and 2, respectively. The supply spindle 3 and takeup spindle 4 associated with reel 1 or 2, respectively, are each also associated with a loop brake 5 or 6, respectively. The loop brakes are engaged or disengaged depending on the direction in which the spindles move. Each brake 5 and 6, respectively, has a free end which is engaged by a spring 7 or 8, respectively. A feeler 10 pivotally disposed at 9 acts on the free end of the brake 5, the magnetic tape 12 being guided over its sensor 11.

At the free end of the brake 6 there is attached a double-armed lever with arms **14*a* and 14*b* arranged eccentrically with respect to a pivotal axis 13. A feeler element 17 pivotally disposed at 16 acts on the double-armed lever 14*a*, 14*b* via a linking member, intermediate lever 15, the tape 12 also passing over its sensor 18. The intermediate lever 15 is coupled, via a rod 19, with the guide lever 21 bearing the pressure roller 20. The feeler element 17 and the intermediate lever 15 comprise feeler means while the double-armed lever 14*a*, 14*b*** is part of the means for automatically reversing, during rewinding, the effect which the associated feeler means has on the associated brake during normal forward operation.

The fully extended position illustrated for the levers shown in FIG. 1 corresponds to the rewind position in which the pressure roller 20 is lifted off the drive capstan 22.

During fast rewinding or reverse speed, i.e. during rewinding from the right-hand or takeup reel 2 onto the left-hand or supply reel 1, the feeler 17 is pivoted, around its axis 16 in a clockwise direction as the diameter of the tape on the takeup reel 2 decreases and the tape tension increases. The feeler 17 thus presses, via the intermediate lever 15, against the left arm 14*a* of the double-armed lever 14*a*, 14*b* so that this arm is moved against the force of the spring 8 in a clockwise direction around its pivotal axis 13. This movement causes the loop brake 6 to be lifted from takeup spindle 4 against the pressure of spring 8 at the same rate as the tape tension increases.

In an analogous manner the loop brake 5 at the supply reel 1 is lifted by the feeler 10 during fast forward operation. The feeler 10 is applied against the force of spring 7 as the diameter decreases.

During normal forward operation, (i.e. "record" or "-playback"), the magnetic tape 12 is pressed against the drive capstan 22 by the pressure roller 20, as shown by the dashed lines in FIG. 1. The tape tension between the left-hand reel 1 and the drive capstan 22 is kept constant by feeler 10 in the same manner as during fast forward operation. However, during normal forward operation, a constant amount of tape is conveyed by the drive capstan 22 and at the same time the winding spindle 4 is driven with a constant moment. Accordingly, the tape tension between reel 1 and guide spindle 22 increases as the diameter of the wound tape on reel 2 increases. Thus, the feeler element 17 would be pivoted in a clockwise direction and the loop brake 6 lifted from spindle 4 via arm 14*a* of the double-armed lever, if the intermediate lever 15 maintained its extended position. In fact, however, the braking action must be increased as the diameter of the wound tape increases so that the increasing tape tension is counteracted by braking away a portion of the winding moment produced by the right-hand winding motor.

This is accomplished according to the present invention by providing that during normal forward operation the intermediate lever 15 is pivoted with respect to the feeler element 17 to such an extent that it now acts on the right lever arm 14*b* of the double-armed lever. Thus the brake 6 is effective as the arm 14*b* is made to pivot in a counterclockwise direction around pivotal axis 13 with increased tape tension at the takeup spindle. Thus, the tape tension at the takeup spindle is correctly regulated.

Preferably, the intermediate lever 15 is actuated by the normal forward operation switch. This switch can be, for example, in the form of an electromagnet. The changeover occurs, as shown in FIG. 1, by coupling the intermediate lever 15 with the guide lever 21 via rod 19, so that when the power magnet 23 is excited the guide lever 21 is moved from the position shown in solid lines and intermediate lever 15 is moved from the extended position shown in solid lines to the position shown in dashed lines.

In the arrangement according to FIG. 1, the double-armed lever is in the form of an arcuate element which provides a curved surface or support for a roller 28 disposed at the end of the intermediate lever 15. The spring 8 is also connected to the guide lever 21 so that the constant component of the braking force against the takeup spindle 4 is also switched automatically in accordance with the differing conditions of rewinding and normal forward operations. Since the braking action in loop brakes is dependent on the direction of movement of the spindles associated therewith—and the ratio of the differing braking actions is defined as the servoratio—it is preferable to dimension the effective lengths of the lever arms 14*a* and 14*b* differently from one another in order to correspond to the servoratio of the loop brake.

Figure 2:
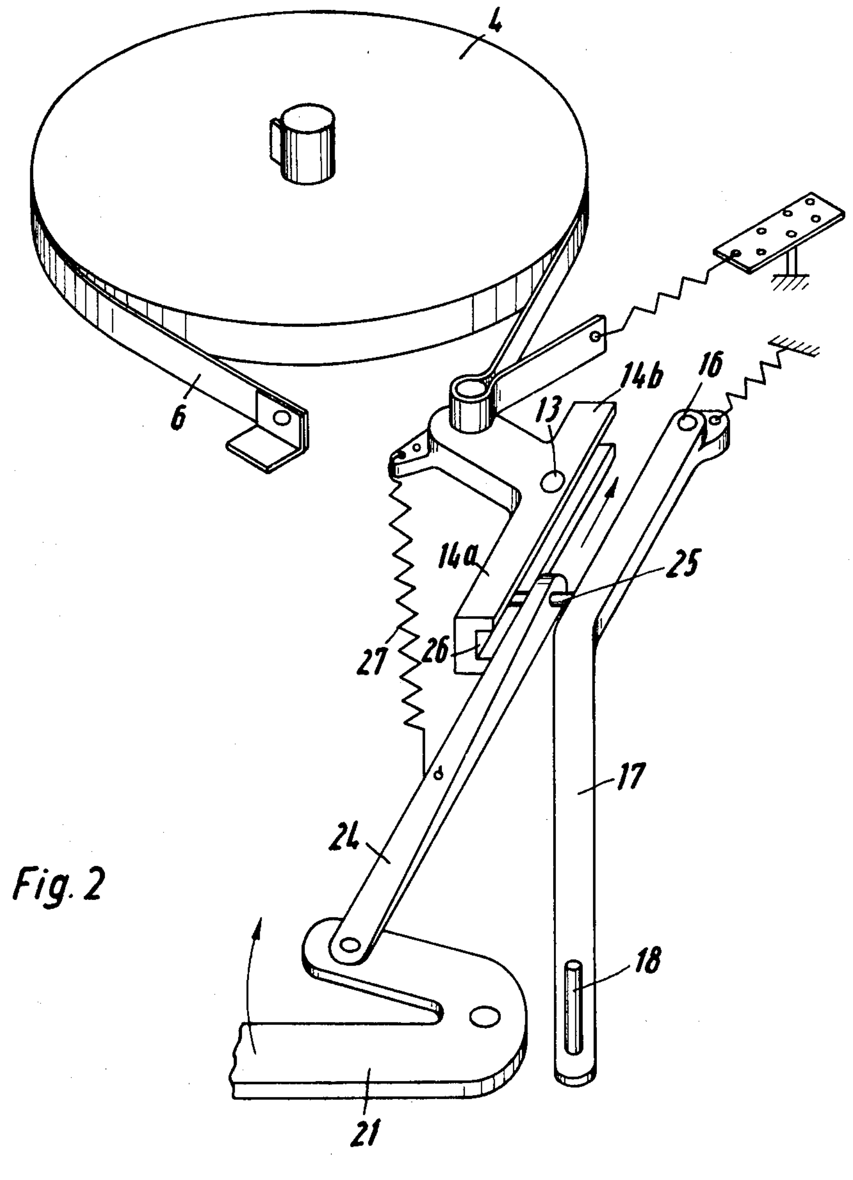
FIG. 2 is a perspective view in detail of another embodiment of the tape tension regulating device of FIG. 1 for the takeup spindle.

In the embodiment illustrated in FIG. 2, identical parts have the same reference numerals as in FIG. 1. In this embodiment, a pusher rod 24 is provided instead of the intermediate lever 15 of FIG. 1. The pusher rod 24 is attached at one end to the guide lever 21 and at its other end there is connected a pin 25. The pin 25 includes a portion which is received in a guide groove 26 which is provided in one side of the double-armed lever 14*a*, 14*b*. The pin 25 also includes a portion which is received in a groove (not shown) in the feeler lever 17. The movement of the feeler element 17 is transferred, via the pin 25, depending on the position of the guide lever 21, either to the lever arm 14*a*, during rewinding, or to the lever arm 14*b*, during normal forward operation.

It will be understood that the above description of the present invention is susceptible to various modifications, changes and adaptations.

I claim:

1. Arrangement for maintaining constant the tension of the tape on the takeup and supply reels, carried by respective spindles, of a magnetic tape recorder, comprising, in combination:

a. a brake operatively associated with the spindle, carrying the reel which, during normal forward operation constitutes the takeup reel;

b. feeler means cooperatively connected to said brake and disposed in the path of the tape for contacting the same, said feeler means responding to the tension in the tape by movement, thereby to control said brake; and c. means for automatically reversing, during "rewind" operation, the effect which said feeler means has on said brake during normal forward operation.

2. Arrangement as defined in claim 1 wherein said feeler means includes a linking member coupling said feeler means to said reversing means; and said reversing means includes a pivotally mounted double-armed lever, said linking member being in contact with said double-armed lever, said brake being eccentrically connected to said double-armed lever, said linking means acting on one of the arms of said double-armed lever to control said brake in accordance with the particular type of operation being performed by the tape recorder.

3. Arrangement as defined in claim 2 wherein said brake is a loop brake and wherein the lengths of the arms of said double-armed lever are at the same ratio as the servoratio of said brake.

4. Arrangement as defined in claim 2 further comprising a switching element operatively connected to said reversing means; hence, to said linking member, so that when said switching element is actuated to cause the tape recorder to perform any given one of its operations, said linking member is caused to engage the appropriate arm of said double-armed lever.

5. Arrangement as defined in claim 4 wherein said switching element is an electromagnet.

6. Arrangement as defined in claim 4 further comprising a guide means having a guide lever and a roller at one end of said guide lever for contacting said tape; said switching element being connected to said reversing means via said guide lever; and said guide lever being coupled to said linking member for moving the same in response to said switching element.

7. Arrangement as defined in claim 6 wherein said feeler means includes a feeler element connected to said linking member, said linking member being in the form of a pusher rod connected at one end to said guide lever and having at its other end a pin, portions of said pin extending from each of two sides of said rod, and said double-armed lever having a guide groove in one side thereof for receiving the portion of said pin extending from one side of the pusher rod, the portion of said pin extending from the other side of the pusher rod being connected to said feeler element, as a consequence of which said pusher rod translates movements of said feeler element into movements along the groove of the arm of said double-armed lever which corresponds to the operation being performed by the tape recorder and the position of said guide lever.

8. Arrangement as defined in claim 2 further comprising a spring connected to the brake associated with said takeup spindle, the tension in said spring, hence the effect of said brake being determined by which arm of said double-armed lever is engaged by said linking member.

9. Arrangement as defined in claim 2 wherein said feeler means includes a feeler element connected to said linking member; said linking member being connected at one end to said feeler element and having a roller at its other end, and said double-armed lever being an arcuate element having a curved surface on which the roller of said linking member is disposed for movement, thereby to translate movements of said feeler element into movements along one of the arms of said double-armed lever.

10. Arrangement as defined in claim 1, wherein the magnetic tape recorder has a capstan, and said feeler means contacts the tape between the capstan and the takeup reel, and further including a brake associated with the supply reel and additional feeler means cooperatively connected to said supply reel brake between the supply reel and the capstan to control said supply reel brake as a function of the tape tension during normal forward operation of the recorder and to release said supply reel brake during rewind.